C. W. EMORY.
PIPE COUPLING.

No. 48,709.    Patented July 11, 1865.

UNITED STATES PATENT OFFICE.

CHAS. W. EMERY, OF DORCHESTER, MASSACHUSETTS.

IMPROVEMENT IN PIPE-COUPLINGS.

Specification forming part of Letters Patent No. 48,709, dated July 11, 1865.

*To all whom it may concern:*

Be it known that I, CHARLES W. EMERY, of Dorchester, in the county of Norfolk, in the Commonwealth of Massachusetts, have invented a new and Improved Mode of Connecting Pipes for Fluid and other Purposes; and I do hereby declare the following to be a full, clear, and exact description thereof, reference being had to the accompanying drawings, making a part of this specification, and to the letters of reference marked thereon, in which—

Figure 1:
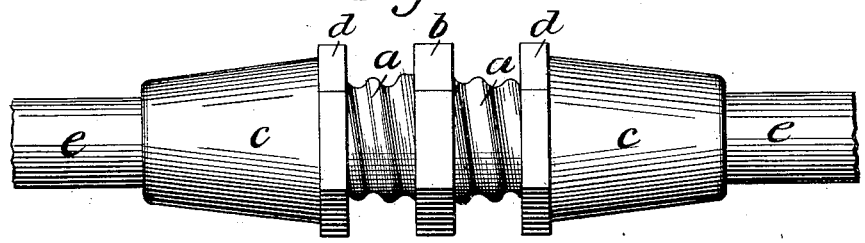
Figure 2:
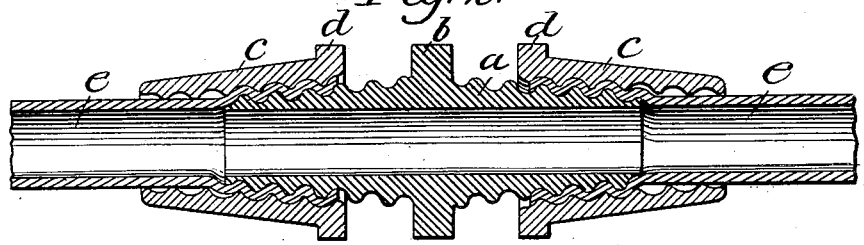
Figure 3:
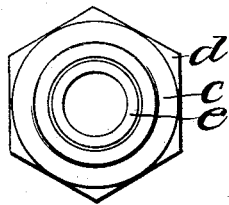
Figure 4:
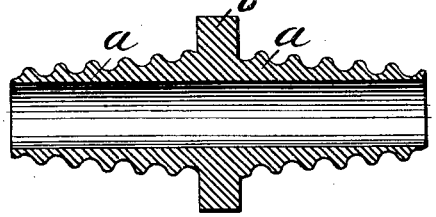
Figure 5:
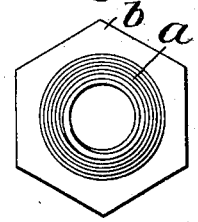

Figure 1 is a plan. Fig. 2 is a longitudinal section. Fig. 3 is an end view. Fig. 4 is a longitudinal section of the thimble with the other parts removed therefrom, and Fig. 5 is an end view of the thimble.

Similar letters refer to like parts in all the figures.

The great feature of my invention is the facility with which rubber, lead, or other flexible pipes may be connected and made air or water tight without using packing or solder.

To enable others skilled in the art to make and use my invention, I will proceed to describe its construction.

In the drawings herein referred to, $a$ represents a thimble, bored out the size of the pipe to be connected thereto, and made of sufficient length to receive a pipe at each end. The outer surface of this thimble is made slightly tapering at each end and has a screw-thread cut thereon. This thread is rounded, so as not to present any sharp edges or corners, as represented in Fig. 4. This thimble has a hexagon collar, $b$, at the center of its length, by which it may be held or turned with a wrench. A tapering screw-cap, $c$, is fitted to each end of the thimble; with a screw-thread formed on its interior surface corresponding with the thread on the thimble, and made to screw loosely thereon. The screw-cap also has a hexagon collar, $d$, on its larger end, by which it may be turned with a wrench.

In Figs. 1, 2, and 3, $e$ represents the pipe to be connected. The screw-cap $c$ is to be slipped onto the pipe $e$. Then the thimble $a$ is to be screwed into the end of the pipe a sufficient distance to hold it firmly. In doing this the end of the pipe becomes enlarged, and by its elasticity or flexibility conforms itself to the shape of the thimble. The screw-cap $c$ is then screwed on over the enlarged end of the pipe to its place, thus pressing the pipe on all sides firmly into the threads of the screw and forming a perfect air and water tight joint, as represented in Fig. 2.

The method thus far described is for a double connection; but it may also be used for a single connection—that is, to have only one end of the thimble tapering to receive the pipe and the other end made straight with a thread cut thereon, by which it may be screwed into a boiler or other vessel.

By using this device two pipes may be readily connected or disconnected or a single pipe connected or disconnected to a boiler or other vessel, at pleasure.

Having thus fully described the construction and utility of my improvements, I will now point out what I claim as my invention and desire to secure by Letters Patent:

The combination of the thimble $a$ with the screw-cap $c$, constructed and operating as herein described.

CHARLES W. EMERY.

Witnesses:
CHAS. W. HAWKES,
M. M. HAWKES.